US012670491B2

(12) United States Patent
Elambaruthi et al.

(10) Patent No.: US 12,670,491 B2
(45) Date of Patent: Jun. 30, 2026

(54) SYSTEMS AND METHODS FOR GENERATING CUSTOM PRODUCTS USING CONFIGURABLE SERVICES PLATFORMS

(71) Applicant: JPMORGAN CHASE BANK, N.A., New York, NY (US)

(72) Inventors: Priya Elambaruthi, Glen Mills, PA (US); Natalie M. Rocco, Grandview Heights, OH (US); Priti Naik, Thane (IN); John F. Michener, Wilmington, DE (US); Howard Spector, Street, MD (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 227 days.

(21) Appl. No.: 18/188,018

(22) Filed: Mar. 22, 2023

(65) Prior Publication Data

US 2023/0306410 A1 Sep. 28, 2023

(30) Foreign Application Priority Data

Mar. 23, 2022 (IN) .............................. 202211016283

(51) Int. Cl.
*G06Q 30/06* (2023.01)
*G06Q 20/34* (2012.01)
*G06Q 30/0601* (2023.01)

(52) U.S. Cl.
CPC ....... *G06Q 20/355* (2013.01); *G06Q 30/0621* (2013.01)

(58) Field of Classification Search
CPC ......................... G06Q 30/0621; G06Q 20/355

(Continued)

(56) References Cited

U.S. PATENT DOCUMENTS 8,089,655 B2 * 1/2012 Elarde ................ G06Q 30/0601
358/1.18
2002/0178113 A1 * 11/2002 Clifford ................ G06Q 40/06
705/36 R (Continued)

FOREIGN PATENT DOCUMENTS

JP 2021179709 A * 11/2021 ............. G06Q 50/10

OTHER PUBLICATIONS

Article, "Guaranty Bank Launches New Consumer Credit Card Program in Partnership with First Bankcard(R)"; Business Wire [New York] May 31, 2016.; retrieved from Dialog on Dec. 30, 2024 (Year: 2016).*

*Primary Examiner* — Yogesh C Garg
(74) *Attorney, Agent, or Firm* — GREENBERG TRAURIG LLP

(57) ABSTRACT

Systems and methods for generating custom products using configurable services platforms are disclosed. A method for generating a custom financial instrument may include: (1) uploading, by a custom card engine computer program executed by a backend electronic device, a plurality of options for financial instrument features to a database; (2) presenting, by the custom card engine computer program, the plurality of options for financial instrument features to a customer on a customer electronic device; (3) receiving, by the custom card engine computer program, a selection of a subset of the plurality of options for financial instrument features from the customer electronic device; (4) generating, by the custom card engine computer program, a custom financial instrument based on the subset of the plurality of options for financial instrument features; and (5) issuing, by the custom card engine computer program, the custom financial instrument to the customer.

8 Claims, 3 Drawing Sheets

(58) Field of Classification Search
USPC ......................................................... 705/26.5
See application file for complete search history.

(56)                         References Cited

U.S. PATENT DOCUMENTS

| | | | |
|---|---|---|---|
| 2008/0162256 A1* | 7/2008 | Moore | G06Q 40/02 |
| | | | 705/35 |
| 2008/0296369 A1* | 12/2008 | Bodington | G06Q 20/04 |
| | | | 235/380 |
| 2018/0247301 A1* | 8/2018 | Gallo | G06Q 20/342 |
| 2018/0322473 A1* | 11/2018 | Castinado | G06Q 20/36 |
| 2020/0387906 A1* | 12/2020 | Vondrak | H04L 63/0861 |
| 2021/0327225 A1* | 10/2021 | Beck | G06Q 20/34 |
| 2022/0374881 A1* | 11/2022 | Iannacci | G06Q 20/4016 |
| 2022/0383061 A1* | 12/2022 | Coleman | G06K 19/02 |
| 2023/0230139 A1* | 7/2023 | Goree | G06Q 30/02 |
| | | | 705/26.5 |

\* cited by examiner

SYSTEMS AND METHODS FOR GENERATING CUSTOM PRODUCTS USING CONFIGURABLE SERVICES PLATFORMS

RELATED APPLICATIONS

This application claims priority to, and the benefit of, Indian Patent Application No. 202211016283 filed Mar. 23, 2022, the disclosure of which is hereby incorporated, by reference, in its entirety.

BACKGROUND OF THE INVENTION

1. Field of the Invention

Embodiments generally relate to systems and methods for generating custom products using configurable services platforms.

2. Description of the Related Art

There are multiple entry points for the planning of the launch of a new financial credit card product. In general, there are no aggregate product to credit card product life-cycle or visibility into existing standard product features. Thus, a marketer must start each launch/refresh from scratch and manage the launch/refresh through manual forms, which is highly inefficient, manual, with redundant data capture across multiple technical forms for each launch.

In addition, card product configurations are generally distributed across multiple platforms, and each new card launch/refresh requires updates to these platforms, many of which have manual dependency. In addition, because there is no central system of record for card product data, card product and card product capabilities are not defined and are mixed within other product boundaries.

SUMMARY OF THE INVENTION

Systems and methods for generating custom products using configurable services platforms are disclosed. According to an embodiment, a method for generating a custom financial instrument may include: (1) uploading, by a custom card engine computer program executed by a backend electronic device, a plurality of options for financial instrument features to a database; (2) presenting, by the custom card engine computer program, the plurality of options for financial instrument features to a customer on a customer electronic device; (3) receiving, by the custom card engine computer program, a selection of a subset of the plurality of options for financial instrument features from the customer electronic device; (4) generating, by the custom card engine computer program, a custom financial instrument based on the subset of the plurality of options for financial instrument features; and (5) issuing, by the custom card engine computer program, the custom financial instrument to the customer.

In one embodiment, the plurality of options for financial instrument features may include card art options, card materials options, card fee options, card reward options, card interest rate options, and card payment options. In one embodiment, the card art options may include uploading an image.

In one embodiment, the method may also include verifying, by the custom card engine computer program, that the subset of the plurality of options for financial instrument features do not conflict with each other. The custom card engine computer program may verify that the subset of the plurality of options for financial instrument features do not conflict with each other by applying a plurality of rules to the subset of the plurality of options for financial instrument features.

In one embodiment, the plurality of options for financial instrument features may be uploaded as nonfungible tokens.

In one embodiment, the method may also include presenting, by the custom card engine computer program, a mockup of the custom financial instrument with the subset of the plurality of options for financial instrument features to the customer electronic device.

In one embodiment, the custom financial instrument is issued to the customer by provisioning the custom financial instrument to a customer electronic wallet on the customer electronic device.

In one embodiment, the method may also include enrolling, by the custom card engine computer program, the custom financial instrument with a plurality of systems, wherein the plurality of systems integrate the subset of the plurality of options for financial instrument features into offerings.

In one embodiment, the custom financial instrument may be portable to a third-party issuer.

According to another embodiment, a system may include: a backend electronic device executing a custom card engine computer program; a plurality of card feature databases, each card feature database comprising a plurality of options for a card feature; and a customer electronic device executing a customer computer program. The custom card engine computer program may upload a plurality of options for financial instrument features to the plurality of card feature databases, may present the plurality of options for financial instrument features to customer computer program on the customer electronic device, may receive a selection of a subset of the plurality of options for financial instrument features from the customer electronic device, may generate a custom financial instrument based on the subset of the plurality of options for financial instrument features, and may issue the custom financial instrument to the customer computer program.

In one embodiment, the plurality of options for financial instrument features may include card art options, card materials options, card fee options, card reward options, card interest rate options, and card payment options. In one embodiment, the card art options may include uploading an image.

In one embodiment, the custom card engine computer program may verify that the subset of the plurality of options for financial instrument features do not conflict with each other. In one embodiment, the custom card engine computer program may verify that the subset of the plurality of options for financial instrument features do not conflict with each other by applying a plurality of rules to the subset of the plurality of options for financial instrument features.

In one embodiment, the plurality of options for financial instrument features may be uploaded as nonfungible tokens.

In one embodiment, the custom card engine computer program may present a mockup of the custom financial instrument with the subset of the plurality of options for financial instrument features to the customer electronic device.

In one embodiment, the custom financial instrument may be issued to the customer by provisioning the custom financial instrument to a customer electronic wallet on the customer electronic device.

In one embodiment, the custom card engine computer program may enroll the custom financial instrument with a plurality of systems, wherein the plurality of systems integrate the subset of the plurality of options for financial instrument features into offerings.

In one embodiment, the custom financial instrument may be portable to a third-party issuer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
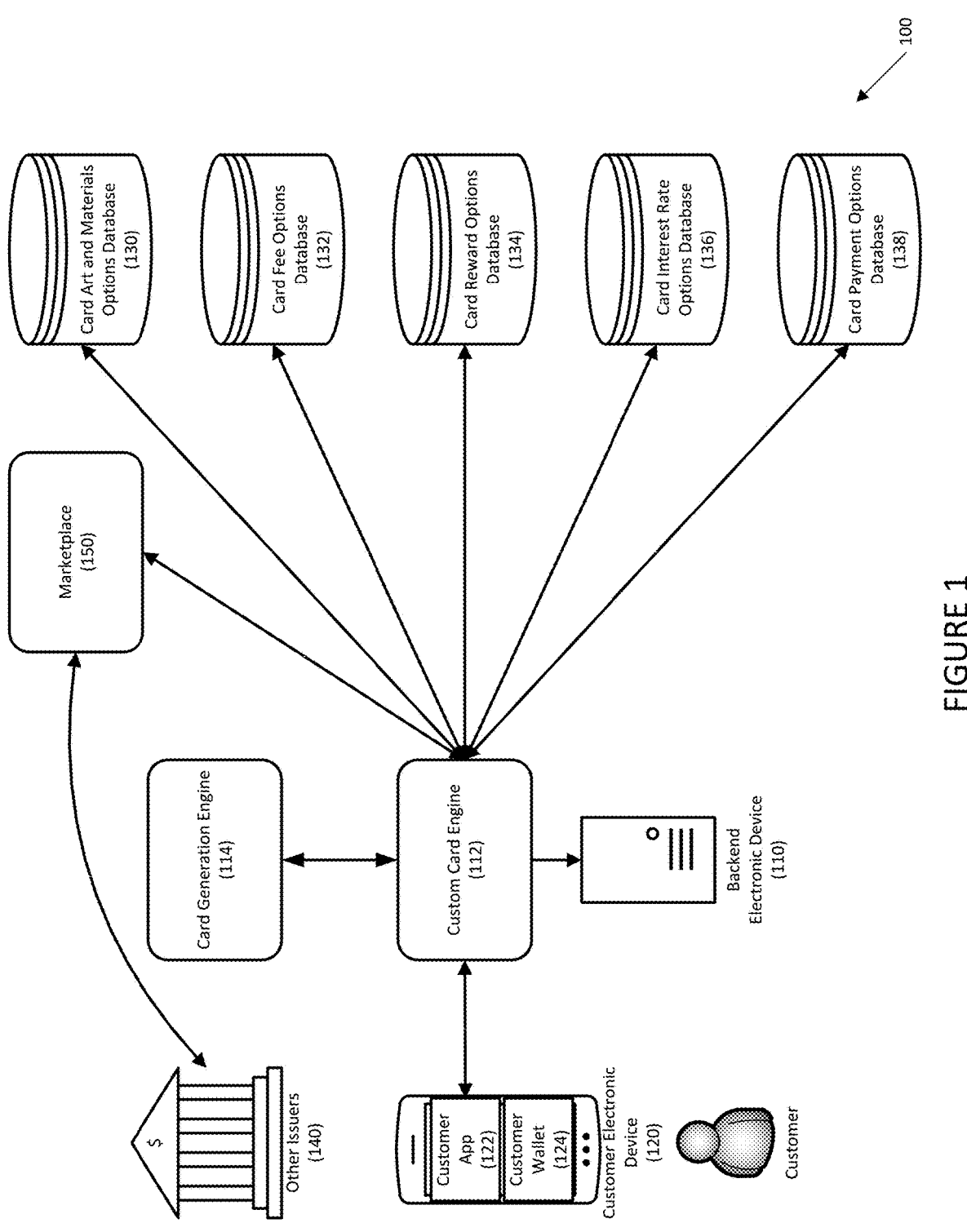
FIG. 1 depicts a system for generating custom products using configurable services platforms according to an embodiment.

Embodiments generally relate to product launch configurable services platforms. Embodiments may leverage user insights as a key input to developing the new platform focused on user experience.

Embodiments may provide some or all of the following: a single interface for credit card "financial" product definition; a menu of standard product features via configurable storefront; product definition pre-fill capability based on a toolkit; a simplified, intuitive language with robust controls and automated workflows with notifications; visibility of deliverables for marketers and stakeholders; improved change management with audit trail; centralized card product configurations; dissemination of card product details across multiple consuming systems; publishing of attributes to a product catalog utility that drives customer experiences across multiple channels; establishment of a card product domain that separates card products from other agile product domains; creation of a central system of record for card product definitions; and registration of new standard features into a configurable storefront.

Embodiments may provide an aggregate platform to define the credit card product lifecycle and transform product planning from a completely manual, start from scratch process with multiple entry points, requiring completion of forms, multiple hand-offs to a single user interface that captures product information once, direct from the marketers using intuitive language with prefill capability, displaying standard features available for selection, automating the current manual hand-offs, and providing visibility into deliverable.

Embodiments may create a system of record and integrate the system of record with utilities to fully utilize the power of data. Machine learning may be used to build unique products with competitive value prop with full understanding of the market and consumer pattern.

Embodiments may allow for end users/our credit card consumers to create avatars and self-configure their own credit card products, choose a benefits structure, the card art, the terms and conditions, the rewards structure, etc.

Embodiments may provide end users with the ability to plan the build of their card product simpler and faster via a platform that provides the ability to view and compare current card product inventory, browse a storefront of existing configurations, features, and experiences that can be enabled for a card product, and use a guided flow to submit a card product for build.

In one embodiment, nonfungible tokens (NFTs) may be used to store card features in an immutable and referenceable format. Other formats and mechanisms for storing card features may be used.

In addition, the customer may take the custom card and may present it to third-party issuers to see if the third-party issuers will provide a custom card with similar (or better) features. Thus, the custom card may be portable from the customer's perspective.

In another embodiment, a third-party issuer may use the platform for its customers to build custom financial instruments and have them ported to the second issuer.

In one embodiment, the card issuer and the third-party issuers may have a revenue share arrangement based on the generation and/or portability of the generated card.

FIG. 1 depicts a system for generating custom products using configurable services platforms according to an embodiment. System 100 may include backend electronic device 110, which may include a server (e.g., physical and/or cloud-based), computers (e.g., workstations, desktops, laptops, notebooks, tablets, etc.), etc. Backend electronic device 110 may execute custom card engine 112, which may be a computer program that may interface with customer app 122 to select features for a custom financial instrument, such as a credit card, a debit card, etc.

Custom card engine 112 may also interface with card generation engine 114, which may execute the creation of the custom financial instrument. Card generation engine 114 may interface with one or more downstream systems (not shown) to generate the custom financial instrument. Examples of such downstream systems may include physical card manufacturing systems, digital card provisioning systems, card authorization systems, etc.

Custom card engine 112 may interface with one or more databases of card features. For example, card art and materials options database 130 may store a plurality of options for card art, such as images, and card materials, such as plastic, metal, etc. that the customer may select from. Card fee options database 132 may store a plurality of different fee options (e.g., no fee, monthly fee, annual fee, etc.) that the customer may select from. Card reward options database 134 may store a plurality of different reward options (e.g., cash back, miles points, earning rates, perks, etc.) that the customer may select from. Card interest rate options database 136 may store a plurality of different interest rate options that the customer may select from. Card payment options database 138 may store a plurality of different payment options that the customer may select from. It should be noted that these card options are exemplary only and other or different card options may be provided as is necessary and/or desired.

Customer application 122 may be executed by customer electronic device 120, such as a computer, a smartphone, a smart watch, an Internet of Things (IoT) appliance, etc. Customer application 122 may be an application provided by a financial institution that is associated with the account for which the card is being designed, or it may be a third party application. In one embodiment, the customer may select options for a card from databases 130, 132, 134, 136, and/or 138 using customer card engine 112. Custom card engine 112 may validate the compatibility of the options selected to make sure they comply with financial institution policies, and may then instruct card generation engine 114 to generate a card and/or token in accordance with the selections.

Customer electronic device 120 may execute customer wallet application 124, which may receive and store provisioned financial instruments.

Custom card engine 112 may also save an approved group of selected options and may make the selection available in marketplace 150 where other customers may select the same options. Custom card engine 112 may also make the card options available to other issuers 140, or the customer may take the options to other issuer 140 and have other issuer 140 generate the card.

Figure 2:
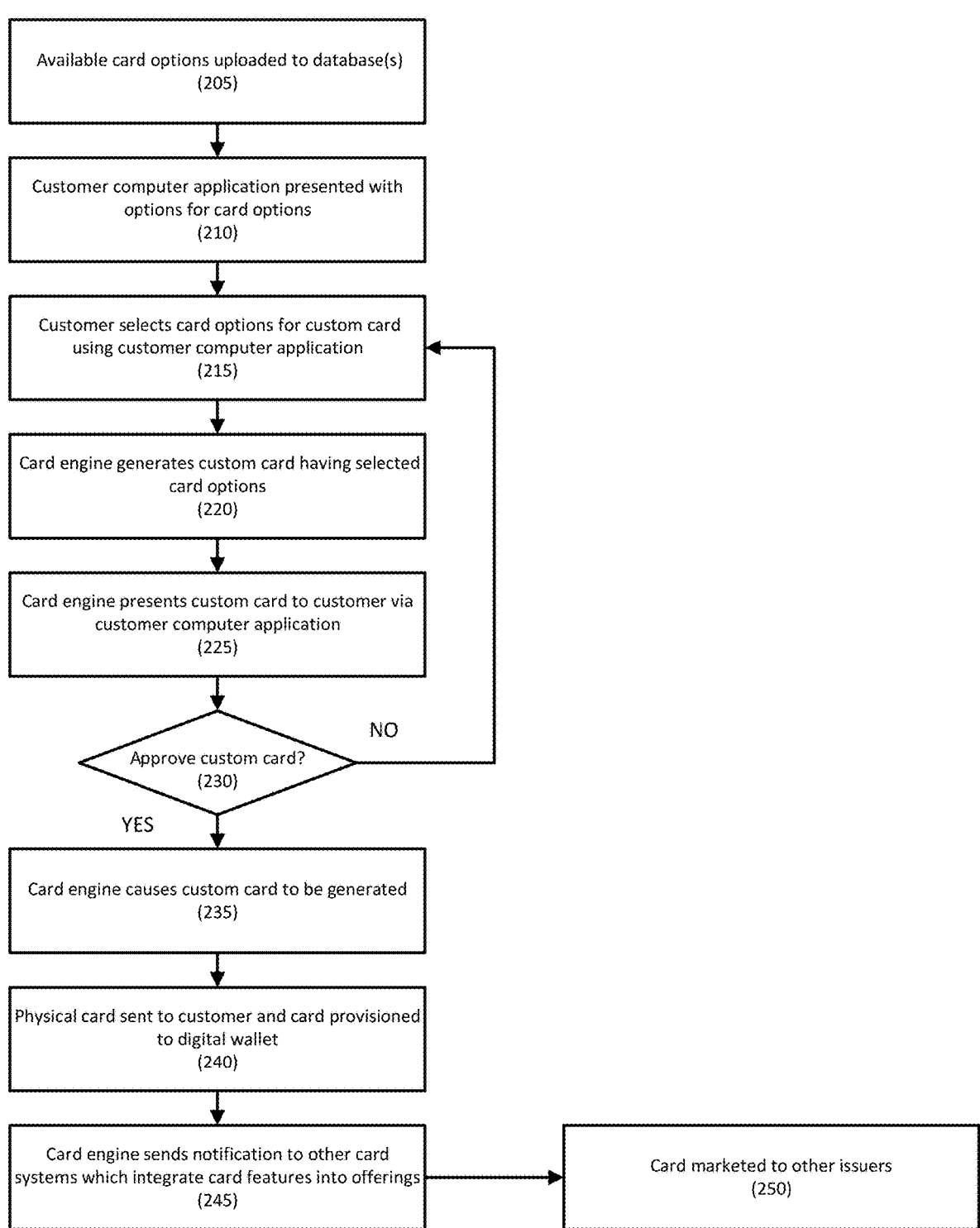
FIG. 2 depicts a method for generating custom products using configurable services platforms according to an embodiment.

Referring to FIG. 2, a method for generating custom products using configurable services platforms is disclosed according to an embodiment.

In step 205, a computer program, such as a custom card engine computer program, may upload available card options to one or more database. Examples of card options may include card art and materials options, card fee options, card reward options, card interest rate options, card payment options, etc. Note that additional card options may be uploaded as is necessary and/or desired.

In one embodiment, the card options may be uploaded as NFTs in an immutable and referenceable format.

In step 210, a customer computer application executed by a customer electronic device may access the custom card engine and may present the customer with the available card options for customizing a card. For example, the customer may be presented with card option categories and may be presented with options for each category of card options.

In one embodiment, the card options in each category may be mutually exclusive to each other, so that the customer may only select one card option. For example, the customer may only select one interest rate option.

In one embodiment, the customer may upload a card option, such as an image, to use as card art.

In step 215, the customer may select one or more card options for the custom card using customer computer application. For example, the customer may select a card option from each card option category.

In step 220, the custom card engine may generate a custom card having the selected options. In one embodiment, the custom card engine may verify that the selected card options do not conflict with one another, are consistent with policies, etc. In one embodiment, rules from a rules database may be applied to the card options as part of this verification.

In step 225, the custom card engine may present the custom card to customer via the customer computer application. In one embodiment, the card engine may present a mock-up of the custom card to the user, such as a graphical representation of the card, a listing of the card options, etc.

In step 230, the custom card engine may ask, via the customer computer application, whether the customer approves of the custom card. If the customer approves, in step 235, the card engine may cause the custom card to be generated. Specifically, in step 240, a physical card may be produced and sent to the customer, and a digital card (e.g., a token) may be provisioned to the customer's digital wallet.

In one embodiment, notifications may be sent to systems (e.g., rewards systems) to enroll the account according to the selected card options.

In step 245, the card engine may send a notification to other card systems which may integrate the selected card options into offerings. For example, in one embodiment, machine learning may be used to identify a line of business or product that the custom card may be relevant to, such as an airline co-brand partner, a particular merchant co-brand partner, etc. Based on that identification, the identified card systems may add the custom card to a standard offering for the line of business or product.

In step 250, the custom card engine may market the custom card to other issuers. For example, the custom card engine may make the custom card available to other issuers in a marketplace, and the other issuers may download details for the custom card and may implement the custom card.

In another embodiment, a customer may download the custom card details and saved identifier for the custom card, and may present the custom card to another issuer. The other issuer may generate a custom card based on the information provided by the customer, or may download additional details from the marketplace using the saved identifier.

Figure 3:
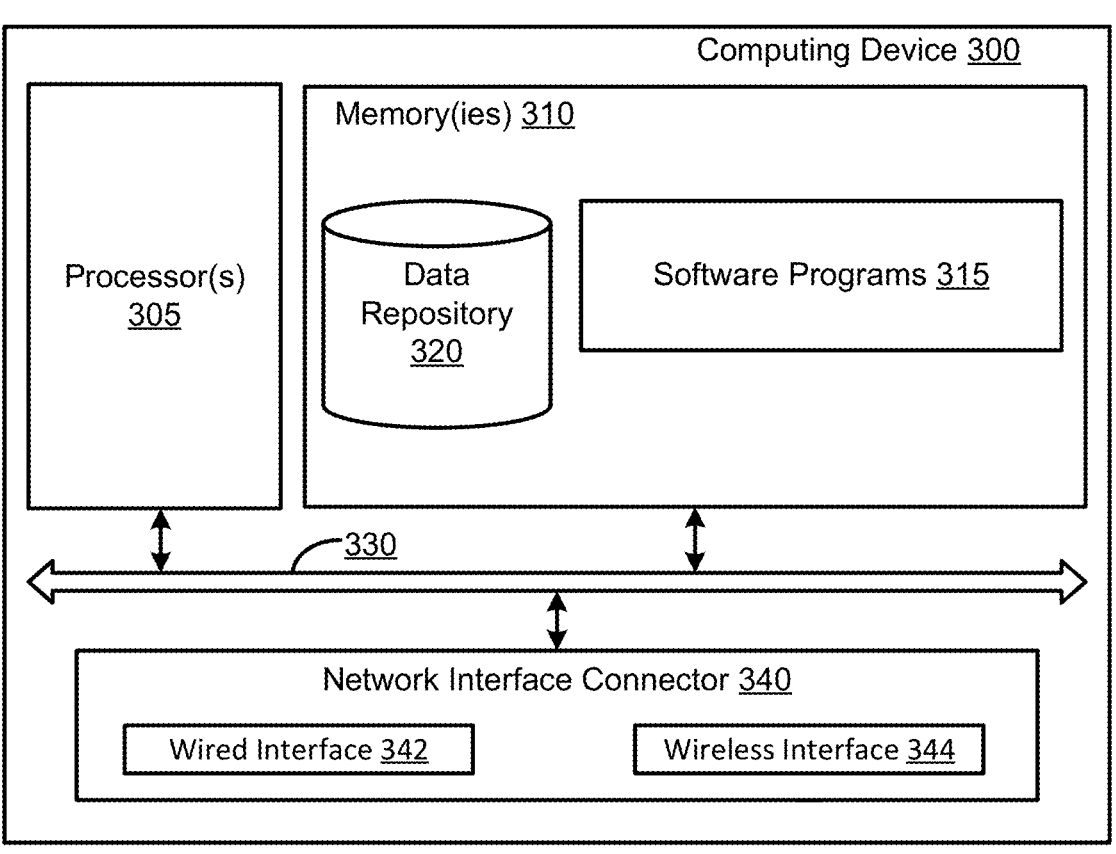
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although several embodiments have been disclosed, it should be recognized that these embodiments are not exclusive to each other, and features from one embodiment may be used with others.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating a custom financial instrument, comprising:

uploading, by a custom card engine computer program executed by a backend electronic device, a plurality of options of a card feature for financial instrument features to a plurality of card feature databases, each card feature database comprising a plurality of options associated with respective financial instrument features in the plurality of card feature database, wherein the plurality of options for financial instrument features are saved as nonfungible tokens, wherein the plurality of options for financial instrument features comprise card art options, card materials options, card fee options, card reward options, card interest rate options, uploading an image, and card payment options;

verifying, by the custom card engine computer program, that a subset of the plurality of options for financial instrument features do not conflict with each other by applying a plurality of rules to the subset of the plurality of options for financial instrument features;

presenting, by the custom card engine computer program, the subset of the plurality of options for financial instrument features to a customer electronic device;

receiving, by the custom card engine computer program, a selection of the subset of the plurality of options for financial instrument features from the customer electronic device;

validating, by the custom card engine computer program, compliance of the plurality of options for financial instrument features with one or more financial institution policies;

generating, by the custom card engine computer program, a custom financial instrument based on the selection of the subset of the plurality of options for financial instrument features;

generating, by a card generation engine executed by the server and in operative communication with the custom card engine computer program, the custom financial instrument as a physical card and provisioning a digital card to the customer electronic device, wherein the card generation engine executed by the server generates the physical card by interfacing with a physical card manufacturing system; and enrolling, by the custom card engine computer program, the custom financial instrument with a plurality of systems, wherein the plurality of systems integrate the subset of the plurality of options for financial instrument features into a plurality of offerings.

2. The method of claim 1, further comprising:

presenting, by the custom card engine computer program, a mockup of the custom financial instrument with the subset of the plurality of options for financial instrument features to the customer electronic device.

3. The method of claim 1, wherein the custom financial instrument is issued to the customer by provisioning the custom financial instrument to a customer electronic wallet on the customer electronic device.

4. The method of claim 1, wherein the custom financial instrument is portable to a third-party issuer.

5. A system, comprising:

a backend electronic device executing a custom card engine computer program;

a plurality of card feature databases, each card feature database comprising a plurality of options for a card feature, the card feature stored as a nonfungible token; and a customer electronic device executing a customer computer program;

wherein:

the custom card engine computer program uploads a plurality of options for financial instrument features to the plurality of card feature databases, each card feature database comprising a plurality of options associated with respective financial instrument features in the plurality of card feature database, wherein the plurality of options for financial instrument features are saved as nonfungible tokens, wherein the plurality of options for financial instrument features comprise card art options, card materials options, card fee options, card reward options, card interest rate options, uploading an image, and card payment options, wherein the plurality of options for financial instrument features are uploaded as nonfungible tokens;

verifying, by the custom card engine computer program, that a subset of the plurality of options for financial instrument features do not conflict with each other by applying a plurality of rules to the subset of the plurality of options for financial instrument features;

the custom card engine computer program presents the subset of the plurality of options for financial instrument features to customer computer program on the customer electronic device;

the custom card engine computer program receives a selection of the subset of the plurality of options for financial instrument features from the customer electronic device;

the custom card engine computer program generates a custom financial instrument based on the selection of the subset of the plurality of options for financial instrument features; and the custom card engine computer program generates, by a card generation engine executed by the server and in operative communication with the custom card engine computer program, the custom financial instrument as a physical card and provisioning a digital card to the customer electronic device, wherein the card generation engine executed by the server generates the physical card by interfacing with a physical card manufacturing system.

6. The system of claim 5, wherein the custom card engine computer program presents a mockup of the custom financial instrument with the subset of the plurality of options for financial instrument features to the customer electronic device.

7. The system of claim 5, wherein the custom financial instrument is issued to the customer by provisioning the custom financial instrument to a customer electronic wallet on the customer electronic device.

8. The system of claim 5, wherein the custom financial instrument is portable to a third-party issuer.

* * * * *